United States Patent [19]
Filgueiras

[11] Patent Number: 5,611,590
[45] Date of Patent: Mar. 18, 1997

[54] REMOVABLE SIDE SUN VISOR ASSEMBLY

[76] Inventor: Jose Filgueiras, 9606 SW. 2nd La., Miami, Fla. 33174

[21] Appl. No.: 616,159

[22] Filed: Mar. 14, 1996

[51] Int. Cl.$^6$ .................................................. B60J 3/02
[52] U.S. Cl. ..................... 296/97.5; 296/97.1; 296/97.8; 296/97.9
[58] Field of Search ............................... 296/97.1, 97.5, 296/97.6, 97.8, 97.9

[56] References Cited

U.S. PATENT DOCUMENTS

| | | | |
|---|---|---|---|
| 4,781,409 | 11/1988 | Harbison | 298/97.6 |
| 5,165,748 | 11/1992 | O'Connor | 296/97.8 |
| 5,259,657 | 11/1993 | Arendt et al. | 296/97.8 |
| 5,466,029 | 11/1995 | Zetterlund | 296/97.8 |

FOREIGN PATENT DOCUMENTS

| | | | |
|---|---|---|---|
| 1917618 | 7/1970 | Germany | 296/97.5 |
| 3833625 | 4/1990 | Germany | 296/97.8 |

Primary Examiner—Gary C. Hoge

[57] ABSTRACT

A removable side sun visor assembly for use in association with a sport utility vehicle including horizontal roll bars, the apparatus comprising: a visor cover with a front surface, a rear surface, a closed upper edge and an open lower edge; a plurality of securing straps, each strap being secured to the front side of the visor cover adjacent to its upper edge, each securing strap including hook and loop fasteners affixed thereto, in an operative orientation each securing strap being coupled around a horizontal roll bar; and a retractable sun visor fabricated of tinted transparent material and including an upper extent and a lower extent, the sun visor being of a slightly smaller size than the visor cover, the retractable sun visor being slidably positioned within the visor cover, the sun visor including coupling devices to permit coupling of the retractable sun visor within the visor cover.

8 Claims, 3 Drawing Sheets

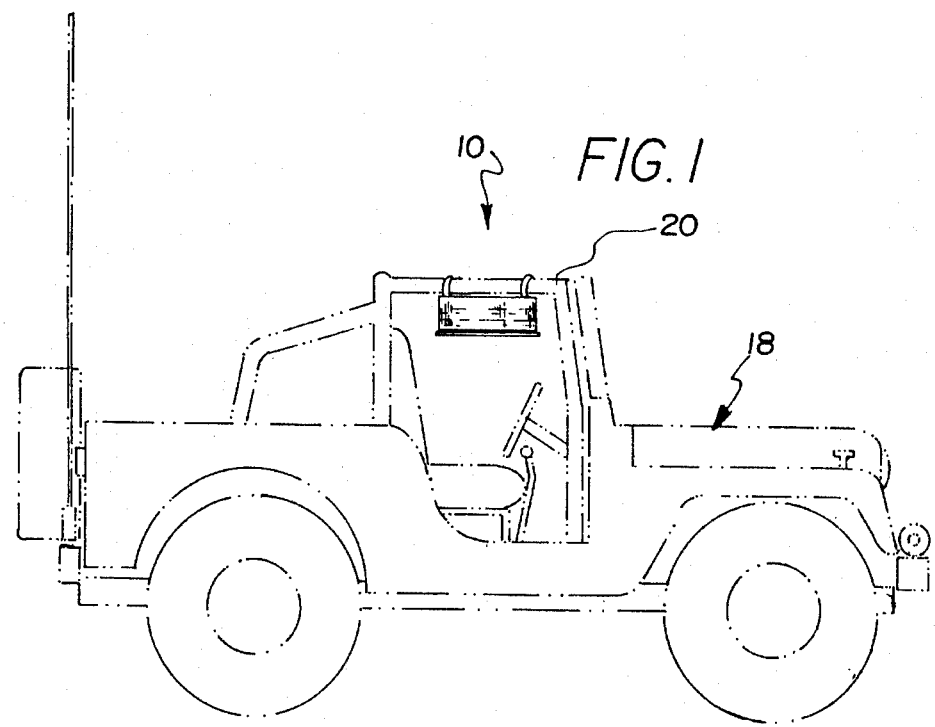
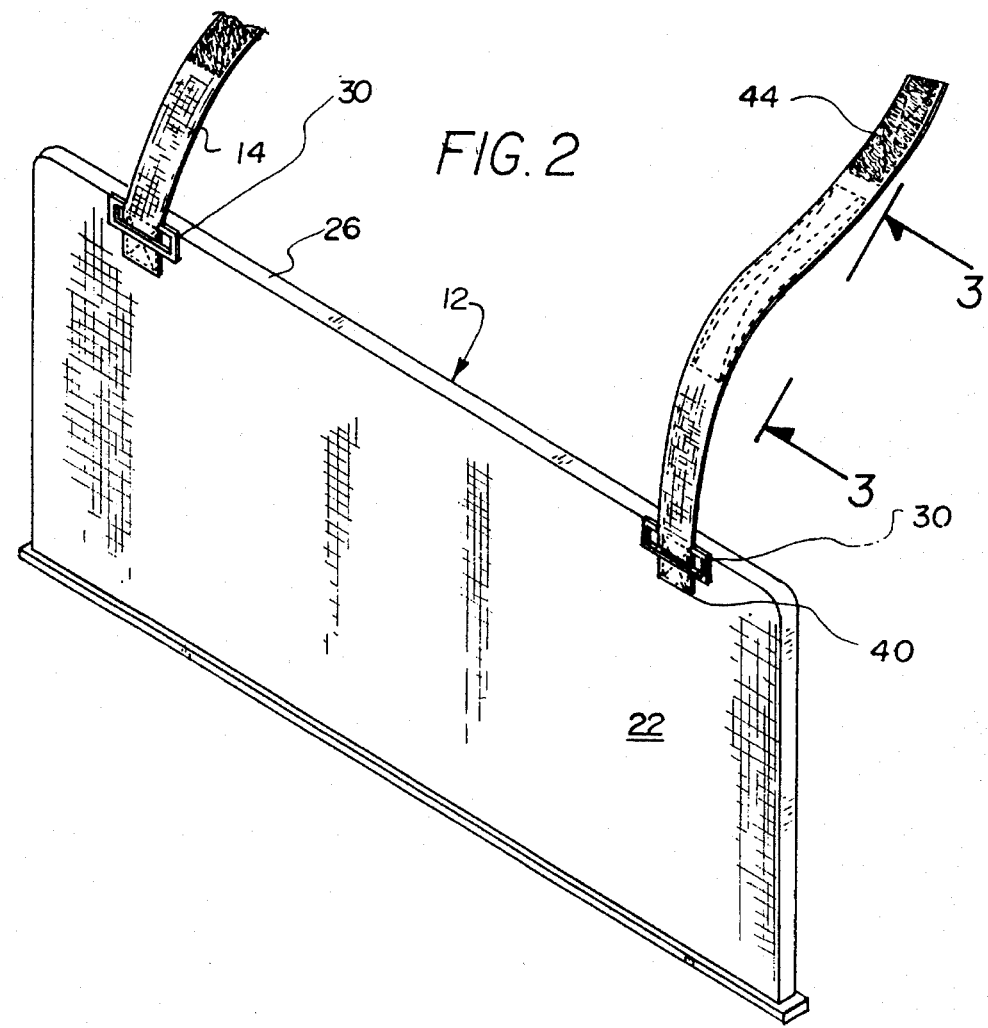

REMOVABLE SIDE SUN VISOR ASSEMBLY

BACKGROUND OF THE INVENTION

1. Field of the Invention

The present invention relates to a removable side sun visor assembly and more particularly pertains to coupling the apparatus to a roll bar of a sport utility vehicle to shield a user from sunlight.

2. Description of the Prior Art

The use of accessory sun visors is known in the prior art. More specifically, accessory sun visors heretofore devised and utilized for the purpose of shielding passengers from sunlight are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,390,973 to Melotti a side window sun visor assembly.

U.S. Pat. No. 4,919,468 to Abu-Shumays et al discloses dual sun visors.

U.S. Pat. No. 4,792,177 to Svensson discloses a sun visor for a vehicle side window.

U.S. Pat. No. 4,468,062 to Marcus discloses a side window visor.

U.S. Pat. No. 4,666,205 to Nakagawa discloses a auxiliary visor for a motor vehicle.

Lastly, U.S. Pat. No. 4,317,589 to Kuss discloses auxiliary sun visors.

In this respect, the removable side sun visor assembly according to the present invention substantially departs from the conventional concepts and designs of the prior art, and in doing so provides an apparatus primarily developed for the purpose of coupling the apparatus to a roll bar of a sport utility vehicle to shield a user from sunlight.

Therefore, it can be appreciated that there exists a continuing need for a new and improved removable side sun visor assembly which can be used for coupling the apparatus to a roll bar of a sport utility vehicle to shield a user from sunlight. In this regard, the present invention substantially fulfills this need.

SUMMARY OF THE INVENTION

In view of the foregoing disadvantages inherent in the known types of accessory sun visors now present in the prior art, the present invention provides an improved removable side sun visor assembly. As such, the general purpose of the present invention, which will be described subsequently in greater detail, is to provide a new and improved removable side sun visor assembly and method which has all the advantages of the prior art and none of the disadvantages.

To attain this, the present invention essentially comprises a new and improved removable side sun visor assembly for use in association with a sport utility vehicle including horizontal roll bars, the apparatus comprising, in combination: a visor cover fabricated of NYLON and formed in a planar generally rectangular configuration with a front surface, a rear surface, two side edges, a closed upper edge and a open lower edge, the visor cover including two buckles affixed adjacent to the upper edge thereof; a plurality of large, medium and small storage pockets being fabricated of NYLON and stitched adjacent to the lower edge of the rear surface of the visor cover, each pocket including an elastic band affixed at its upper extent, each large storage pocket having approximately seventy percent of the height and twenty percent of the width of the visor cover, each medium storage pocket having approximately fifty percent of the height and ten percent of the width of the visor cover, each small storage pocket having approximately fifty percent of the height and seven percent of the width of the visor cover, the pockets enabling a user to store various sized items within the visor cover; two adjustable securing straps, each strap being fabricated of synthetic materials and formed in an elongated planar rectangular configuration, each strap having an inboard end, and outboard end, a front side and a rear side, the inboard end of each strap being positioned through a buckle and stitched to the front side of the visor cover, the rear side of the inboard end of each securing strap including female hook and loop fasteners affixed thereto, the front side of the outboard end of each securing strap including male hook and loop fasteners affixed thereto, in an operative orientation each securing strap being positioned around a horizontal roll bar and adjustably coupled through a buckle, the straps being tightened around the roll bar with the male and female hook and loop materials being coupled together; and a retractable sun visor fabricated of tinted plastic and formed in a generally rectangular configuration, the sun visor including an upper extent and a lower extent and having a slightly smaller height and width than the visor cover, the retractable sun visor being slidably positioned within the visor cover, the upper extent of the retractable sun visor having two side tabs extending therefrom, the side tabs permitting coupling of the retractable sun visor within the visor cover, the lower extent of the retractable sun visor including a gripping handle formed in a generally rectangular configuration and positioned perpendicularly to the plane of the visor cover, the gripping handle enabling a user to pull sun visor downwardly through the open lower edge of the visor cover.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved removable side sun visor assembly which has all of the advantages of the prior art accessory sun visors and none of the disadvantages.

It is another object of the present invention to provide a new and improved removable side sun visor assembly which may be easily and efficiently manufactured and marketed.

It is further object of the present invention to provide a new and improved removable side sun visor assembly which is of durable and reliable constructions.

An even further object of the present invention is to provide a new and improved removable side sun visor assembly which is susceptible of a low cost of manufacture with regard to both materials and labor, and which accordingly is then susceptible of low prices of sale to the consuming public, thereby making such removable side sun visor assembly economically available to the buying public.

Still yet another object of the present invention is to provide a new and improved removable side sun visor assembly which provides in the apparatuses and methods of the prior art some of the advantages thereof, while simultaneously overcoming some of the disadvantages normally associated therewith.

Still another object of the present invention is coupling the apparatus to a roll bar of a sport utility vehicle to shield a user from sunlight.

Lastly, it is an object of the present invention to provide a new and improved removable side sun visor assembly for use in association with a sport utility vehicle including horizontal roll bars, the apparatus comprising: a visor cover with a front surface, a rear surface, a closed upper edge and an open lower edge; a plurality of securing straps, each strap being secured to the front side of the visor cover adjacent to its upper edge, each securing strap including hook and loop fasteners affixed thereto, in an operative orientation each securing strap being coupled around a horizontal roll bar; and a retractable sun visor fabricated of tinted transparent material and including an upper extent and a lower extent, the sun visor being of a slightly smaller size than the visor cover, the retractable sun visor being slidably positioned within the visor cover, the sun visor including coupling devices to permit coupling of the retractable sun visor within the visor cover.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the removable side sun visor assembly constructed in accordance with the principles of the present invention.

FIG. 2 is a perspective view of the front surface of the visor cover illustrating the securing straps.

The same reference numerals refer to the same parts through the various Figures.

DESCRIPTION OF THE PREFERRED EMBODIMENT

Figure 3:
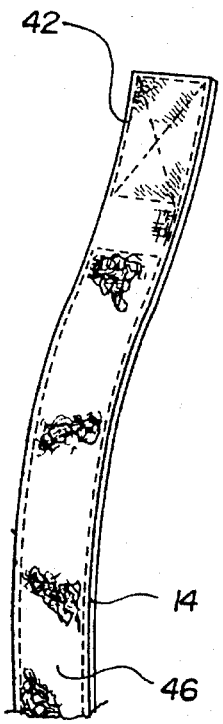
FIG. 3 is an enlarged front perspective view of the securing straps of the apparatus illustrating the hook and loop fasteners.

With reference now to the drawings, and in particular to FIG. 1 thereof, the preferred embodiment of the new and improved removable side sun visor assembly embodying the principles and concepts of the present invention and generally designated by the reference numeral 10 will be described.

The present invention, the removable side sun visor assembly 10 is comprised of a plurality of components. Such components in their broadest context include a visor cover 12, two securing straps 14 and a retractable sun visor 16. Such components are individually configured and correlated with respect to each other so as to attain the desired objective.

The new and improved removable side sun visor assembly 10 is adapted for use in association with a sport utility vehicle 18 which includes horizontal roll bars 20. There are a variety of vehicles which include horizontally positioned roll bars. Examples of such vehicles include jeep type vehicles and other sport utility vehicles with an open top. The roll bars of such vehicles extend along the sides of the vehicles from the front to the back.

More specifically, the visor cover 12 is fabricated of NYLON and formed in a planar generally rectangular configuration with a front surface 22 and a rear surface 24. In alternative embodiments, the visor cover is fabricated of one of the following materials: leather, water resistant cloth, plastic and other synthetic materials. The visor cover includes two side edges, a closed upper edge 26 and an open lower edge 28. The length of the visor cover is between two and two and one-half times its height. The visor cover includes two rectangular ring shaped buckles 30 affixed adjacent to its upper edge. The straps are coupled through the buckles in an operative orientation. Note FIGS. 1 and 2.

Figure 4:
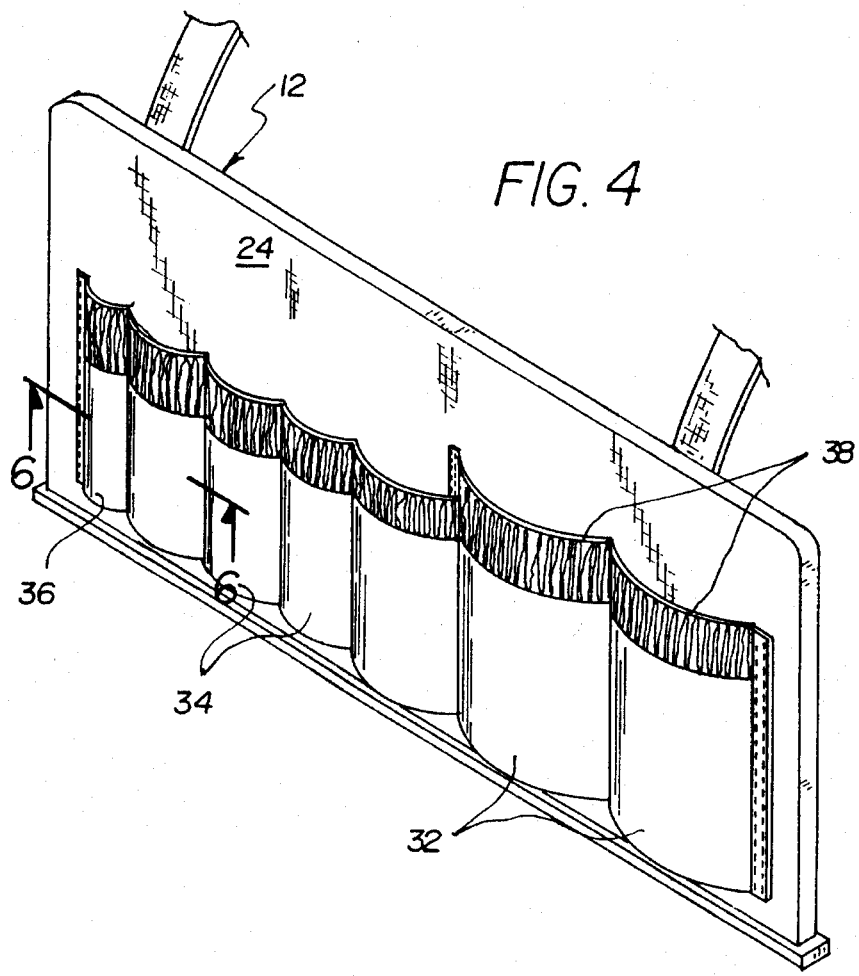
FIG. 4 is a perspective view of the rear surface of the visor cover illustrating the storage pockets.
Figure 6:
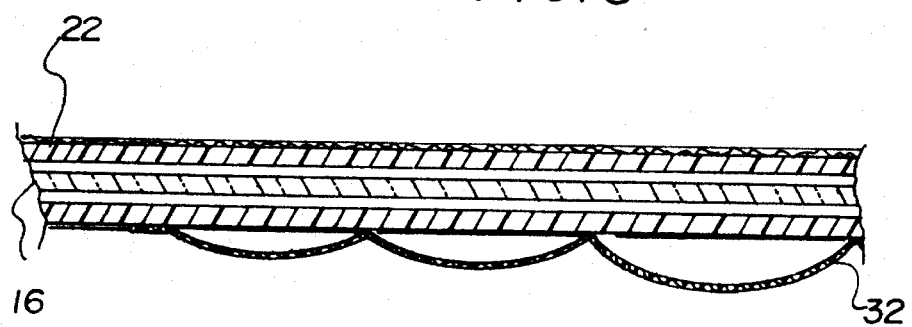
FIG. 6 is a cross-sectional view of the apparatus taken along section line 6—6 of FIG. 4.

Two large storage pockets 32, four medium storage pockets 34 and one small storage pocket 36 are included in the preferred embodiment of the apparatus. In alternative embodiments of the apparatus, different combinations of pocket sizes are available. Each of the pockets is fabricated of NYLON and stitched adjacent to the lower edge of the rear surface of the visor cover. In alternative embodiments, the visor cover is fabricated of one of the following materials: leather, water resistant cloth, plastic and other synthetic materials. Each pocket includes an elastic band 38 affixed at its upper extent. The elastic band holds the items in the pouch securely within the interior. In alternative embodiments, hook and loop fasteners may be used to secure the pockets in a closed position. Note FIGS. 4 and 6.

In the preferred embodiment, each large storage pocket 32 has approximately seventy percent of the height and twenty percent of the width of the visor cover. Each medium storage pocket 34 has approximately fifty percent of the height and ten percent of the width of the visor cover, and each small storage pocket 36 has approximately fifty percent of the height and seven percent of the width of the visor cover. In alternative embodiments, the pockets are formed in various sizes. The pockets enable a user to store various sized items within the visor cover. This useful feature could be used to store items for the vehicle such as maps, or personal items, such as sunglasses. Note FIGS. 4 and 6.

Two securing straps 14 are included with the apparatus. Each strap is fabricated of synthetic materials and formed in an elongated planar rectangular configuration. Each strap has an inboard end 40, an outboard end 42, a front side and a rear side. The inboard end of each strap is positioned through a buckle and stitched to the front side of the visor cover. The rear side of each securing strap includes female 46 hook and loop fasteners affixed to it. The front side of the inboard end of each securing strap includes male 44 hook and loop fasteners affixed to it. In the preferred embodiment the hook and loop fasteners are fabricated of VELCRO. Note FIGS. 2 and 3.

In an operative orientation each securing strap is positioned around a horizontal roll bar 20 and adjustably coupled through a buckle. In the fully assembled orientation the apparatus 10 is positioned parallel to the roll bar and perpendicular to the windshield of the vehicle 18. The straps are then pulled tightly around the roll bar to insure a secure coupling below the roll bar. This prevents unwanted movement of the apparatus when the vehicle is in motion. The male and female hook and loop materials are then coupled together. The adjustability of the straps permits coupling around a plurality of differently sized vehicle roll bars. Note FIG. 1.

Figure 5:
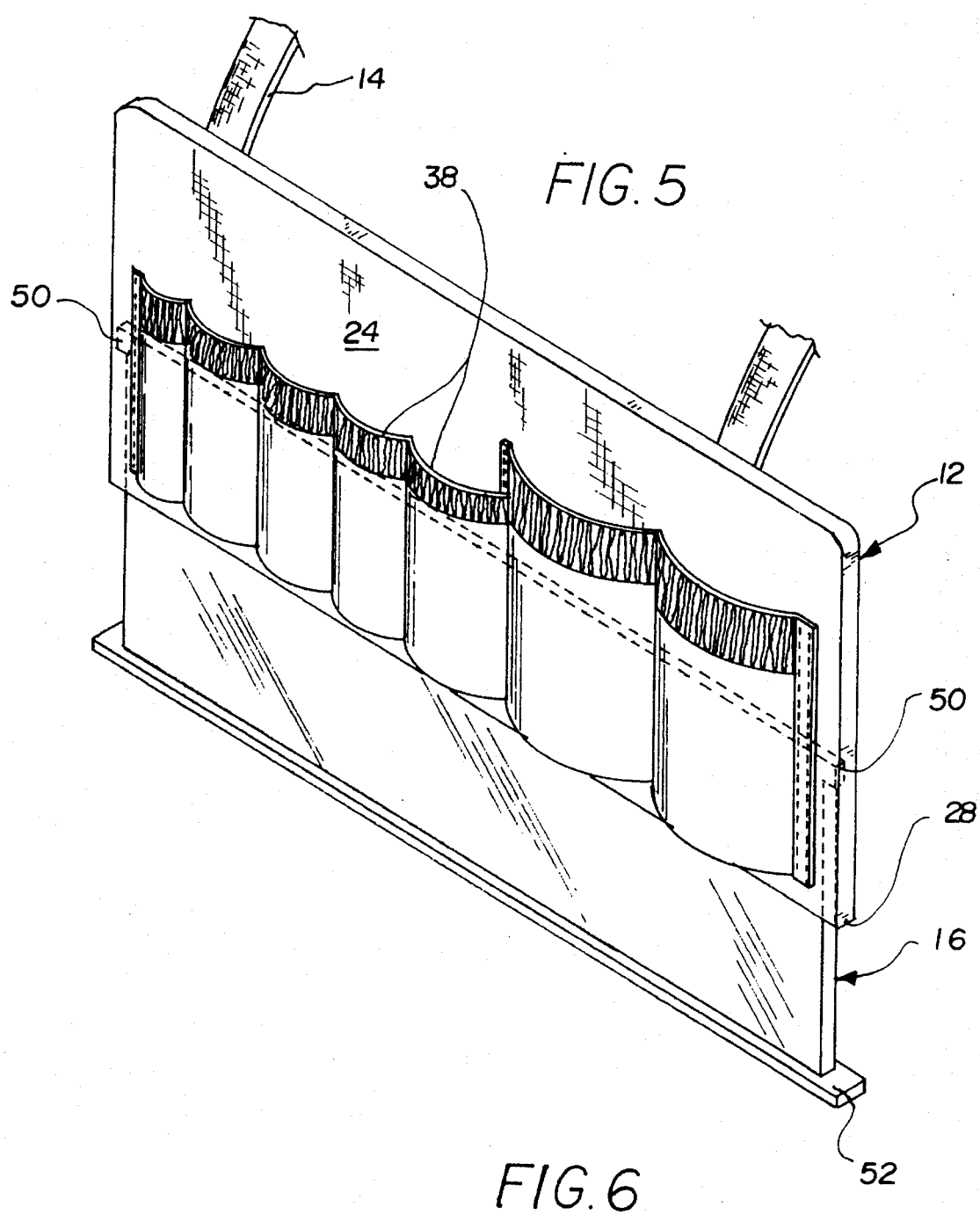
FIG. 5 is a perspective view of the rear surface of the apparatus illustrating the tinted plastic retractable sun visor.

The retractable sun visor 16 is fabricated of tinted plastic and formed in a generally rectangular configuration. The sun visor includes an upper extent and a lower extent. The sun visor has a slightly smaller height and width than the visor cover to permit slidable coupling within the visor cover. The upper extent of the retractable sun visor has two side tabs 50 extending from it. The side tabs permit coupling of the retractable sun visor within the visor cover. Note FIG. 5.

The lower extent of the retractable sun visor includes a gripping handle 52 formed in a generally rectangular configuration and positioned perpendicularly to the plane of the visor cover. The gripping handle enables a user to pull the sun visor downwardly through the open lower edge of the visor cover. The side tabs permit the user to completely or partially extend the visor. Note FIGS. 5 and 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved removable side sun visor assembly for use in association with a sport utility vehicle including horizontal roll bars, the apparatus comprising, in combination:

a visor cover fabricated of NYLON and formed in a planar generally rectangular configuration with a front surface, a rear surface, two side edges, a closed upper edge and a open lower edge, the visor cover including two buckles affixed adjacent to the upper edge thereof;

a plurality of large, medium and small storage pockets being fabricated of NYLON and stitched adjacent to the lower edge of the rear surface of the visor cover, each pocket including an elastic band affixed at its upper extent, each large storage pocket having approximately seventy percent of the height and twenty percent of the width of the visor cover, each medium storage pocket having approximately fifty percent of the height and ten percent of the width of the visor cover, each small storage pocket having approximately fifty percent of the height and seven percent of the width of the visor cover, the pockets enabling a user to store various sized items within the visor cover;

two adjustable securing straps, each strap being fabricated of synthetic materials and formed in an elongated planar rectangular configuration, each strap having an inboard end, and outboard end, a front side and a rear side, the inboard end of each strap being positioned through a buckle and stitched to the front side of the visor cover, the rear side of the inboard end of each securing strap including female hook and loop fasteners affixed thereto, the front side of the outboard end of each securing strap including male hook and loop fasteners affixed thereto, in an operative orientation each securing strap being positioned around a horizontal roll bar and adjustably coupled through a buckle, the straps being tightened around the roll bar with the male and female hook and loop materials being coupled together; and a retractable sun visor fabricated of tinted plastic and formed in a generally rectangular configuration, the sun visor including an upper extent and a lower extent and having a slightly smaller height and width than the visor cover, the retractable sun visor being slidably positioned within the visor cover, the upper extent of the retractable sun visor having two side tabs extending therefrom, the side tabs permitting coupling of the retractable sun visor within the visor cover, the lower extent of the retractable sun visor including a gripping handle formed in a generally rectangular configuration and positioned perpendicularly to the plane of the visor cover, the gripping handle enabling a user to pull sun visor downwardly through the open lower edge of the visor cover.

2. A removable side sun visor assembly comprising in combination:

a spot utility vehicle including horizontal roll bars:

a visor cover with a front surface, a rear surface, a closed upper edge and an open lower edge;

a plurality of securing straps, each strap being secured to the front side of the visor cover adjacent to its upper edge, each securing strap including hook and loop fasteners affixed thereto, said straps being coupled around one of said horizontal roll bars; and a retractable sun visor fabricated of tinted transparent material and including an upper extend and a lower extent, the sun visor being of a slightly smaller size than the visor cover, the retractable sun visor being slidably positioned within the visor cover, the sun visor including coupling devices to permit coupling of the retractable sun visor within the visor cover.

3. The removable side sun visor assembly as set forth in claim 2 wherein the rear surface of the visor cover includes a plurality of storage pockets stitched thereto, each pocket including an elastic band affixed at its upper extent.

4. The removable side sun visor assembly as set forth in claim 3 wherein the plurality of storage pockets include at least two large, at least two medium and at least two small storage pockets, the pockets enabling a user to store various sized items in the visor cover.

5. The removable side sun visor assembly as set forth in claim 2 wherein the visor cover and retractable sun visor are formed in a generally rectangular configuration.

6. The removable side sun visor assembly as set forth in claim 2 wherein the visor cover and pockets are fabricated of NYLON, and wherein the hook and loop fasteners are fabricated of VELCRO.

7. The removable side sun visor assembly as set forth in claim 2 wherein the visor cover and pockets are fabricated of leather.

8. The removable side sun visor assembly as set forth in claim 2 wherein the visor cover and pockets are fabricated of water resistant cloth.

* * * * *